Dec. 26, 1967   C. D. MURDOCH   3,360,228

SWINGABLE SUPPORT FOR A MIRROR

Filed March 21, 1966

INVENTOR
COLIN D. MURDOCH
BY
William R. Piper
ATTORNEY 3,360,228
SWINGABLE SUPPORT FOR A MIRROR
Colin D. Murdoch, Walnut Creek, Calif., assignor to Jacob E. Rhodes and Mary L. Rhodes
Filed Mar. 21, 1966, Ser. No. 535,943
2 Claims. (Cl. 248—480)

ABSTRACT OF THE DISCLOSURE

A swingable support for a mirror that has a bracket swingable about a vertical axis, the bracket carrying upper and lower mirror supporting clips. Each clip is channel-shaped for slidably supporting the mirror frame therebetween. The upper clip has a double looped leaf spring with its central portion secured to the clip and its looped ends yieldingly and frictionally contacting with the top of the frame for permitting the mirror to be adjusted laterally in the clips and held against accidental movement.

---

It is difficult for a person to comb or brush his hair at the back of his head if he cannot see what he is doing. The usual practice is for a person to stand in front of a mirror and then hold a hand mirror in back of his head with one hand and use the other hand for holding the comb or brush. The hand mirror has to be moved into different angular positions so the person can see the reflection of the back of his head by means of both the hand mirror and the other mirror positioned in front of him while he is combing or brushing his hair. It is not only tiring to hold a hand mirror in these awkward positions but it also deprives the person of the use of both hands during the combing or brushing act.

An object of my invention is to provide a swingable support for a mirror that permits lateral adjustment thereof so that the mirror can be held at the proper angle at the backside of a person and permit him to stand in front of one of the two mirrors and view the back of his head in the adjustable mirror. The bracket supported mirror can be shifted laterally in its support as well as be swung into different angular positions during the brushing or combing of the hair. The person has free use of both of his hands.

The mirror is mounted in mirror holding clips which in turn are connected to a mirror supporting bracket. A wall bracket pivotally supports the mirror bracket so that the latter will permit the mirror to be swung into the desired angular position about a vertical axis. One of the clips carries a self-compensating leaf spring that contacts with the mirror frame at two points, these points being equidistant from the vertical axis about which the mirror swings.

The device is simple in construction and is durable and efficient for the purpose intended. Other objects and advantages will appear as the specification continues and the novel features of the invention will be set forth in the appended claims.

Drawing

For a better understanding of my invention, reference should be made to the accompanying drawing, forming part of this specification, in which.

While I have shown the preferred form of my invention, it should be understood that various changes or modifications may be made within the scope of the annexed claims without departing from the spirit thereof.

Detailed description

Figure 1:
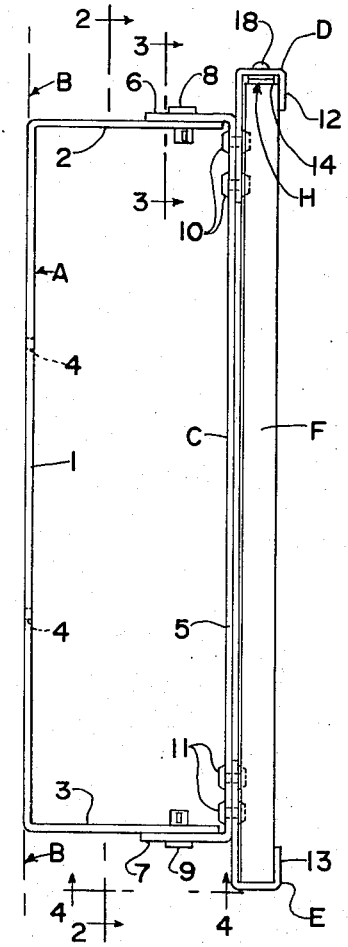
FIGURE 1 is a side elevation of the device and is shown attached to a supporting surface such as the wall of a room.
Figure 5:
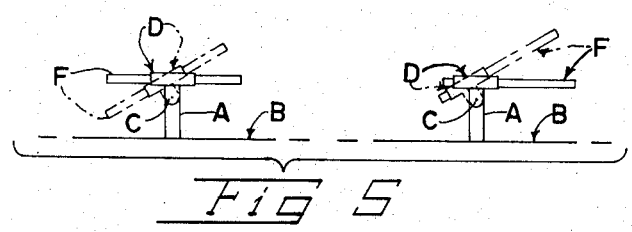
FIGURE 5 shows two schematic views illustrating the pivotal swinging of the mirror and its lateral adjustment in the mirror supporting clips.

In carrying out my invention, I provide a main bracket A that may be secured to a supporting surface such as a wall indicated at B, in FIGURES 1 and 5. The bracket is preferably made of spring steel that is chromium plated although I do not wish to be limited to any particular type of material. The bracket has a base 1 and parallel arms 2 and 3 that extend at right angles to the base. The bracket base 1 has openings 4 through which nails or screws, not shown, may be inserted for securing the bracket to a supporting surface such as the wall B.

A mirror supporting bracket C has a base 5 that parallels the base 1 of the wall bracket A and it has integral arms 6 and 7 that extend at right angles to the base 5 and align with the outer surfaces of the arms 2 and 3 of the wall bracket so as to frictionally contact them. Removable pivot members 8 and 9 pivotally connect the brackets A and C, together. FIGURE 1 shows the top pivot member 8 inserted in aligned openings in the arms 2 and 6 for pivotally connecting them together and also shows the bottom pivot member 9 inserted in aligned openings in the arms 3 and 7 for pivotally connecting them together. Any type of pivotal connection between the pairs of contacting arms 2 and 6 and 3 and 7 may be used without departing from the spirit of my invention. The frictional contact between the arms 2 and 6 and the arms 3 and 7 will hold the mirror bracket in any desired angular position into which it has been swung.

Figure 2:
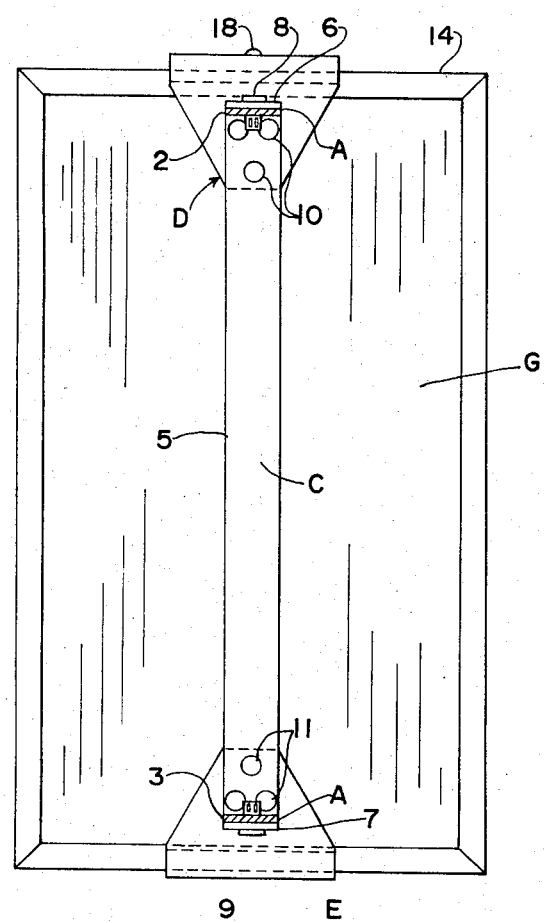
FIGURE 2 is a vertical section taken along the line 2—2 of FIGURE 1.

In FIGURES 1 and 2, I show an upper mirror holding clip D secured to the base 5 of the bracket C, by rivets 10 or other suitable fastening means. A lower mirror supporting clip E is secured to the base 5 by rivets 11, or the like. Both clips D and E have channel-shaped portions 12 and 13, respectively, that face each other, see FIGURE 1, and slidably support a mirror frame F, in which a mirror G is mounted.

Figure 3:
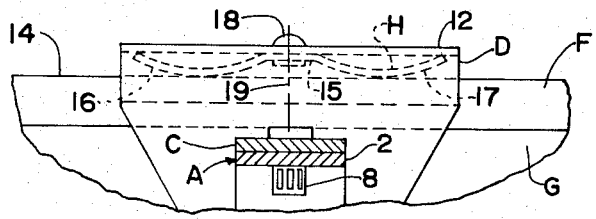
FIGURE 3 is an enlarged vertical section of a portion of the device and is taken along the line 3—3 of FIGURE 1. The upper mirror holding clip and the leaf spring are illustrated in this FIGURE.
Figure 4:
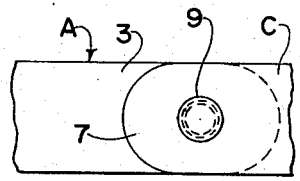
FIGURE 4 is an enlarged detail when looking in the direction of the arrows 4—4 of FIGURE 1, and illustrates the pivotal connection between the wall and mirror brackets.

Referring to the enlarged view of FIGURE 3, it will be noted that there is a space in the channel 12 of the upper clip D provided between the upper edge 14 of the mirror frame F and the inner surface of the base of the channel and this space receives a leaf spring H. This spring is preferably made of phosphorous bronze, but I do not wish to be confined to any particular type of material. The leaf spring has a central portion 15 that is secured to the inner surface of the base or web of the channel 12 and it has two looped portions 16 and 17 that have their centers yieldingly pressing against the top edge 14 of the mirror frame E so as to frictionally contact with this edge at two points, both of which are disposed equidistant from the axis of a rivet 18 that secures the leaf spring to the upper clip D. The rivet axis 19, see FIGURE 3, lies in a plane that extends through the common axis of the pivot members 8 and 9 and the plane extends at right angles to the plane of the mirror bracket base 5. The outer ends of the leaf spring H may yieldingly contact with the inner surface of the base of the channel 12.

The double looped leaf spring H takes up any play between the two clips D and E and the mirror frame F. Also the leaf spring will permit lateral movement of the mirror and frame F in the two clips and will yieldingly hold the frame against accidental lateral movement. The double looped leaf spring is self-compensating in that it will apply an equal frictional force on the top edge 14 of the frame E at two points which are the same distance from the rivet axis 19.

One of the features of my invention is that not only can the mirror bracket C and the clips D and E permit the mirror and frame F to be swung angularly about a vertical axis as shown by the dot-dash lines in the left hand view of FIGURE 5, but the mirror and frame can be moved laterally with respect to the clips as clearly shown in the right hand view of the same figure. The double looped leaf spring H will hold the mirror frame F in this laterally adjusted position.

*Operation*

From the foregoing description of the various parts of the device, the operation thereof may be readily understood. The bracket A may be attached to any supporting surface such as the wall B. The bracket A supports the mirror and frame F in a position preferably opposite or along side of a fixed mirror on a dresser or on another wall that parallels the first wall. The mirror supporting bracket C and clips D and E will permit the mirror and mirror frame F to be swung into different desired angular positions so that the person using it can look into the fixed mirror in front of him and see the back of his head in the swingable mirror G disposed in back of him. It is now possible for the person to use both hands in combing, brushing or adjusting the hair at the back of his head.

Also if the swingable mirror and mirror frame F needs to be moved laterally in the supporting clips D and E, this can be done and the double looped spring H will hold the mirror frame in the position into which it has been moved. The arms 2 and 3 of the bracket A will exert enough friction on the adjacent arms 6 and 7 of the mirror bracket C to yieldingly hold the mirror in the desired angular position into which it has been swung.

I claim:

1. A mirror supporting bracket having a base swingable about a vertical axis;
    (a¹) means for mounting the bracket for pivotal adjustment about said axis;
    (a) upper and lower mirror supporting clips secured to said base;
    (b) said upper mirror supporting clip having a channel-shaped portion for slidably receiving the top of a mirror carrying frame for permitting lateral adjustment of the frame in said clip; and
    (c) a double looped leaf spring having its central portion secured to said upper clip and the double looped portion received to said channel and bearing against the mirror frame and said channel at two spaced apart points from the point where the spring is connected to said channel so that the double looped portions will be self-compensating.

2. The combination as set forth in claim 1 and in which
    (a) the connection between said leaf spring and said upper clip lies in a plane that includes the pivotal axis of the mirror supporting bracket; and
    (b) said double looped portions of said spring adapted to bear against the adjacent mirror frame at two points which are equidistant from said leaf spring connection.

References Cited

UNITED STATES PATENTS

| | | | |
|---|---|---|---|
| 1,654,751 | 1/1928 | Oishei | 248—487 |
| 1,699,043 | 1/1929 | Bell | 350—282 |
| 2,943,536 | 7/1960 | Stafford | 248—479 |

JOHN PETO, *Primary Examiner.*